US 9,151,979 B2

(12) United States Patent
You et al.

(10) Patent No.: US 9,151,979 B2
(45) Date of Patent: Oct. 6, 2015

(54) IN-CELL CAPACITIVE TOUCH PANEL LCD MODULE AND METHOD FOR DRIVING THE SAME

(71) Applicant: Shanghai Tianma Micro-Electronics Co., Ltd., Shanghai (CN)

(72) Inventors: Shuai You, Shanghai (CN); Jun Ma, Shanghai (CN); Conghua Ma, Shanghai (CN); Qijun Yao, Shanghai (CN)

(73) Assignee: Shanghai Tianma Micro-Electronics Co., Ltd., Shanghai (CN)

( * ) Notice: Subject to any disclaimer, the term of this patent is extended or adjusted under 35 U.S.C. 154(b) by 3 days.

(21) Appl. No.: 14/139,730

(22) Filed: Dec. 23, 2013

(65) Prior Publication Data

US 2014/0111476 A1    Apr. 24, 2014

Related U.S. Application Data

(63) Continuation of application No. PCT/CN1012/086192, filed on Dec. 7, 2012.

(30) Foreign Application Priority Data

Sep. 26, 2012    (CN) .......................... 2012 1 0365235

(51) Int. Cl.
*G06F 3/041*    (2006.01)
*G02F 1/1333*    (2006.01)
(Continued)

(52) U.S. Cl.
CPC .......... *G02F 1/13338* (2013.01); *G06F 3/0412* (2013.01); *G06F 3/0416* (2013.01); *G09G 3/3655* (2013.01); *G02F 2201/121* (2013.01);
(Continued)

(58) Field of Classification Search
CPC .................................. G06F 3/041; G06F 3/045
USPC ............. 345/104, 173–175; 178/18.01–18.06
See application file for complete search history.

(56) References Cited

U.S. PATENT DOCUMENTS

| 8,792,062 B2 * | 7/2014 | Hwang et al. .................... 349/12 |
| 2010/0110040 A1 | 5/2010 | Kim et al. |

(Continued)

FOREIGN PATENT DOCUMENTS

| CN | 101419521 A | 4/2009 |
| CN | 101866228 A | 10/2010 |

(Continued)

OTHER PUBLICATIONS

Office Action for Chinese Patent Application No. 201210365235.1, mailed Feb. 16, 2015, 8 pages total (English translation not available).

*Primary Examiner* — Pegeman Karimi
(74) *Attorney, Agent, or Firm* — Alston & Bird LLP

(57) ABSTRACT

An in-cell touch panel LCD module (100) and a method for driving the same includes a common electrode layer including first and second common electrodes. A control circuit divides the frame time period into a display time period and a touch control time period. A display signal is applied to the common electrode layer during the display time period for a normal LCD display. First and second touch control signals are applied to the first and second common electrodes, respectively, during the touch control time period, so that the electric potential of the first common electrode equals to that of the driving line and the electric potential of the second common electrode equals to that of the sensing line.

20 Claims, 8 Drawing Sheets

(51) Int. Cl.
 *G09G 3/36* (2006.01)
 *G06F 3/044* (2006.01)

(52) U.S. Cl.
 CPC ....... *G06F 3/044* (2013.01); *G06F 2203/04107* (2013.01); *G09G 2300/0426* (2013.01)

(56) References Cited

U.S. PATENT DOCUMENTS

| | | | |
|---|---|---|---|
| 2010/0128000 | A1 | 5/2010 | Lo et al. |
| 2011/0242050 | A1 | 10/2011 | Byun et al. |
| 2012/0206403 | A1* | 8/2012 | Wang et al. ................... 345/174 |
| 2012/0274603 | A1* | 11/2012 | Kim et al. ..................... 345/174 |
| 2013/0241868 | A1* | 9/2013 | Kim et al. ..................... 345/174 |
| 2013/0314343 | A1* | 11/2013 | Cho et al. ...................... 345/173 |

FOREIGN PATENT DOCUMENTS

| | | |
|---|---|---|
| CN | 101957507 A | 1/2011 |
| CN | 102109690 A | 6/2011 |
| CN | 102221755 A | 10/2011 |
| CN | 102375629 A | 3/2012 |

\* cited by examiner

IN-CELL CAPACITIVE TOUCH PANEL LCD MODULE AND METHOD FOR DRIVING THE SAME

CROSS-REFERENCES TO RELATED APPLICATIONS

This application claims priority to and is a continuation of PCT/CN2012/086192, filed on Dec. 7, 2012, entitled "IN-CELL CAPACITIVE TOUCH PANEL LCD MODULE AND METHOD FOR DRIVING THE SAME", which claims the benefit of Chinese patent application No. 201210365235.1, filed with the Chinese Patent Office on Sep. 26, 2012, entitled "IN-CELL CAPACITIVE TOUCH PANEL LCD MODULE AND METHOD FOR DRIVING THE SAME", the contents of which are incorporated herein by reference in their entirety.

FIELD OF THE INVENTION

The present invention relates to the field of touch sensing and liquid crystal display (LCD), and in particular to an in-cell capacitive touch panel LCD module and a method for driving the same.

BACKGROUND OF THE INVENTION

Touch panels are touch-sensing input apparatuses, which are widely used. The most commonly known types of touch panels include resistive touch panels, capacitive touch panels, surface infrared touch panels, and the like according to the principle of touch sensing. The resistive touch panel has been popular for years due to its advantages of low cost, easy implementation and simple control. In recent years, the capacitive touch panel becomes popular because it has high light transmittance, good abrasion resistance, good resistance to environmental variations in temperature and humidity, long operating life, and advanced and complex functions such as multi touch capability.

Integrating the touch panel as a graphical user interface into a display device such as an LCD screen is well-known. Traditionally, the touch panel is adhered externally to the display screen. In this case, the touch panel and the display screen are fabricated separately and then assembled together. As shown in FIG. 1, a touch panel 10 includes a first protection layer 11, a second protection layer 13 and a touch layer 12 located between the first protection layer 11 and the second protection layer 13. The first protection layer 11 and the second protection layer 13 may be glass or special material films. The first protection layer 11 is disposed at the outside of the touch panel 10, and the second protection layer 13 is disposed close to the display screen 20. The display screen 20 includes an upper glass substrate 21 and a lower glass substrate 22. A black matrix layer 23, a color filter layer 24, a common electrode layer 25, a liquid crystal layer 26 and a thin film transistor (abbreviated as TFT) layer 27 are formed sequentially between the upper glass substrate 21 and the lower glass substrate 22. The touch panel 10 is an outboard touch panel, and the display screen 20 has poor optical performance due to the complex structure and large thickness of the touch panel 10.

In order to reduce the thickness of the whole module and improve the optical performance, the way for integrating the touch panel is directly integrated into the display screen directly (i.e., the touch panel and the display screen are manufactured simultaneously) has aroused more and more concern. In this way, the touch panel structure is fabricated in the upper glass substrate of the LCD screen. A touch panel includes an on-cell touch panel (on-cell TP) and an in-cell touch panel (in-cell TP) according to integrating manner.

For the on cell touch panel, the touch panel is integrated into the outside surface of the upper glass substrate of the display screen, that is, the upper glass substrate of the display screen is also used as the lower protection layer of the touch panel. As shown in FIG. 2, a touch panel 30 includes a protection layer 31 and a touch layer 32 below the protection layer 31, and the protection layer 31 is placed outside the touch panel. A display screen 40 includes an upper glass substrate 41 and a lower glass substrate 42. A black matrix layer 43, a color filter layer 44, a common electrode layer 45, a liquid crystal layer 46 and a thin film transistor (abbreviated as TFT) layer 47 are formed sequentially between the upper glass substrate 41 and the lower glass substrate 42.

For the in-cell touch panel, the touch panel structure is completely integrated into the liquid crystal screen. As shown in FIG. 3, the in-cell touch panel LCD module includes an upper glass substrate 51; a lower glass substrate 52; and a touch layer 53, a black matrix layer 54, a color filter layer 55, a common electrode layer 56, a liquid crystal layer 57 and a TFT layer 58 formed sequentially between the upper glass substrate 51 and the lower glass substrate 52.

The touch layer in the on cell touch panel and the in-cell touch panel includes multiple parallel driving lines extending in an X direction and multiple parallel sensing lines extending in a Y direction, and the driving lines cross the sensing lines. The detection principle of the touch panel will be described briefly: When a driving signal is applied to the driving line and a signal change is detected on the sensing line. The driving line is used to determine the coordinate in the X direction of the touch point, and the sensing line is used to determine the coordinate in the Y direction of the touch point. In detecting, the driving lines in the X direction are scanned line by line and the signal on each sensing line is read during the scanning, thus each of crossings of the driving lines and the sensing lines may be traversed by one cycle of scanning. Therefore, the location corresponding to the touch action is determined. An equivalent circuit diagram of a crossing of a driving line and a sensing line is shown in FIG. 4. A mutual capacitance 61 is formed at each crossing, and the mutual capacitance 61 is equal to a sum of a right opposite capacitance formed at the position at which the driving line is right opposite to the sensing line and an edge capacitance formed at the edge positions of the driving line and the sensing line. An equivalent resistance of the driving line is defined as resistance 62, and an equivalent resistance of the sensing line is defined as resistance 63. Capacitance 64 is equivalent to a parasitic capacitance of the driving line with respect to the ground, and capacitance 65 is equivalent to a parasitic capacitance of the sensing line with respect to the ground. An excitation source 66 generates a drive signal. A touch control detection circuit 67 is an amplifier which converts an electric signal on the sensing line into an output voltage signal Vout. When the touch panel is touched by a finger, a bridge is built between the driving line and the sensing line at the touch location as the finger is an electrical conductor, that is, a capacitor is connected with the mutual capacitance 61 in parallel, therefore, the value of equivalent mutual capacitance 61 is increased, which causes a change in and electric signal on the sensing line, and accordingly, a change of the output voltage Vout.

The on-cell touch panel has the advantage of small noise interference, but also has complex production process and low yield compared with the in-cell touch panel. Therefore, the in-cell touch panel is mostly widely employed. However, the touch layer is very close to the common electrode layer in the existing in-cell capacitive touch panel LCD apparatus, and the touch panel is sensing the touch control signal from the user while the LCD screen is displaying images frame by frame, therefore, the touch panel is likely be affected by the electrical noise generated by the LCD screen, leading to a low signal-to-noise ratio of the touch panel.

BRIEF SUMMARY OF THE INVENTION

Embodiments of the present invention provide solution to improve the signal-to-noise ratio of the existing in-cell touch panel.

FIG. 5 is a simplified circuit diagram of a conventional liquid crystal screen. As shown in FIG. 5, the liquid crystal screen includes a liquid crystal display array including multiple gate electrode wires 71 and multiple source electrode wires 72. The gate electrode wires 71 are controlled by a gate electrode drive circuit 73 and the source electrode wires 72 are controlled by a source electrode drive circuit 74. The crossing point of the gate electrode wire 71 and the source electrode wire 72 forms a display pixel, and each display pixel includes a pixel on-off switch 75, a display pixel equivalent capacitance 76 and a storage capacitance 77. The pixel on-off switch 75 is a thin film transistor (TFT), and the display pixel equivalent capacitance 76 consists of a pixel electrode and a common electrode. When the liquid crystal screen is displaying an image, the gate electrode drive circuit 73 and the source electrode drive circuit 74 output pulses with the same pulse width to the gate electrode wires 71 and the source electrode wires 72, respectively. The gate electrode drive circuit 73 outputs a single pulse (i.e., a pixel selecting signal) to the gate electrode wires 71 line by line, and the source electrode drive circuit 74 outputs a continuous pulse to all the source electrode wires 72 simultaneously, thus a line by line scanning and imaging of pixels in the liquid crystal display array are achieved. Specifically, the pixel selecting signal on the gate electrode wire 71 selects pixels line-by-line in sequence, and the voltage level of the display signal on the source electrode wire 72 determines the gray scale value of each pixel.

The scan frequency of standard liquid crystal screen is 60 Hz, that is, each frame lasts approximately 16.7 milliseconds. However, for most of the pixel on-off switches of the liquid crystal display array, the width of the gate electrode pulse is small, and the time for scanning one frame in the line by line manner may be shorter than the standard time of each frame. Taking a Quarter Video Graphics Array (QVGA) liquid crystal screen with pixels of 240*320 as an example, the widest pulse that can be responded by the gate electrode of the pixel on-off switch is 52 microseconds. Referring to FIG. 5, assuming that the gate electrode drive circuit 73 outputs a gate electrode drive pulse with a pulse width of 40 microseconds, only 13 milliseconds are needed for scanning all the pixels to form a frame of image with pixels of 240*320, that is, the liquid crystal screen has a time margin of 3.7 seconds being in an idle state. In the present invention, this time margin is used as a touch sensing time of the touch panel. The common electrode layer includes a first common electrode and a second common electrode which are independent from each other, and at least a portion of the driving line overlaps with the first common electrode and at least a portion of the sensing line overlaps with the second common electrode. A first touch control signal is applied to the first common electrode and a second touch control signal is applied to the second common electrode during the touch control time, where the first touch control signal causes the first common electrode to have an electric potential equal to that of the driving line, and the second touch control signal causes the second common electrode to have an electric potential equal to that of the sensing line. Therefore, the noise interference generated by the liquid crystal screen may be shielded and the signal-to-noise ratio of the touch panel may be improved.

Based on the above concept, embodiments of the present invention provide an in-cell capacitive touch panel LCD module. The in-cell capacitive touch panel LCD module includes:

a first substrate and a second substrate disposed opposite to each other;

multiple spaced-apart driving lines and multiple spaced-apart sensing lines disposed between the first substrate and the second substrate, wherein the driving lines cross the sensing lines;

a common electrode layer disposed between the first substrate and the second substrate and located below the driving lines and the sensing lines, wherein the common electrode layer includes multiple spaced-apart first common electrodes and multiple spaced-apart second common electrodes; at least a portion of the driving line overlaps with the first common electrode, and at least a portion of the sensing line overlaps with the second common electrode; and the first common electrode is disposed at an interval between two adjacent second common electrodes, and the first common electrodes cross the second common electrodes and the first common electrodes are electrically isolated from the second common electrodes; and a control circuit adapted to divide a time period of each frame into a display time period and a touch control time period, to supply a display signal to the common electrode layer during the display time period; and to supply a first touch control signal to the first common electrode and supply a second touch control signal to the second common electrode during the touch control time period, where the first touch control signal causes the first common electrode to have an electric potential equal to that of the driving line, and the second touch control signal causes the second common electrode to have an electric potential equal to that of the sensing line.

Optionally, the driving line has a first surface facing the first common electrode, the sensing line has a second surface facing the second common electrode, the first common electrode has a third surface facing the driving line, and the second common electrode has a fourth surface facing the sensing line. The driving line completely overlaps with the first common electrode and the first surface of the driving line has an area equal to or smaller than that of the third surface of the first common electrode; and the sensing line completely overlaps with the second common electrode and the second surface of the sensing line has an area equal to or smaller than that of the fourth surface of the second common electrode.

Optionally, the third surface of the first common electrode has an area equal to or greater than that of the first surface of the driving line, and the fourth surface of the second common electrode has an area equal to or greater than that of the second surface of the sensing line.

Optionally, the first common electrode includes multiple first electrode units and first connecting wires electrically connecting two adjacent first electrode units together, and the second common electrode includes multiple second electrode units and second connecting wires electrically connecting two adjacent second electrode units together; an interval is between an edge sidewall of a first electrode unit and an edge sidewall of a second electrode unit; and the first connecting wires cross the second connecting wires.

Optionally, the control circuit includes a display signal generating unit, a touch control signal generating unit, and a switch unit. The touch control signal generating unit includes a first touch control signal generating subunit and a second touch control signal generating subunit. The switch unit is adapted to connect the common electrode layer to the display signal generating unit during the display time period, and to connect the common electrode layer to the touch control signal generating unit during the touch control time period. The first common electrode is connected to the first touch control signal generating subunit. The second common electrode is connected to the second touch control signal generating subunit.

Optionally, the common electrode layer is an indium tin oxide layer.

Optionally, the in-cell capacitive touch panel LCD module further includes a color filter layer disposed between the first substrate and the second substrate, a liquid crystal layer disposed between the color filter layer and the second substrate, and a thin film transistor layer disposed between the liquid crystal layer and the second substrate, where the common electrode layer is disposed between the color filter layer and the liquid crystal layer or between the liquid crystal layer and the second substrate.

Embodiments of the present invention also provide a method for driving the above in-cell capacitive touch panel LCD module. The method includes:

dividing, by the control circuit, a time period of each frame into a display time period and a touch control time period;

supplying, by the control circuit, a display signal to the common electrode layer in the display time period during which the gate electrode of the pixel on-off switch is in an on state; and supplying, by the control circuit, a first touch control signal to the first common electrode and a second touch control signal to the second common electrode in the touch control time, wherein the first touch control signal causes the first common electrode to have an electric potential equal to that of the driving line and the second touch control signal causes the second common electrode to have an electric potential equal to that of the sensing line.

Optionally, the display time period can be before or after the touch control time period within the time period of each frame.

Optionally, the in-cell capacitive touch panel LCD module further includes a pixel on-off switch disposed on the second substrate, and a gate electrode of the pixel on-off switch is in an off state during the touch control time period.

The present invention has many advantages over the prior art.

The time period of each frame for the in-cell touch panel LCD module is divided into a display time period and a touch control time period in the present invention. The display signal is applied to the common electrode layer during the display time period, and the LCD screen displays an image in the normal operation mode. The first touch control signal is applied to the first common electrode in the common electrode layer and the second touch control signal is applied to the second common electrode in the common electrode layer during the touch control time period to make the electric potential of the first common electrode equal to that of the driving line and to make the electric potential of the second common electrode equal to that of the sensing line. At least a portion of the driving line overlaps with the first common electrode and at least a portion of the sensing line overlaps with the second common electrode, the first common electrode and the driving line form a capacitor, and the second common electrode and the sensing line form a capacitor, and the electric potentials of two plates of each of the capacitors are the same. Therefore, the noise generated by the LCD screen may be shielded, and the signal-to-noise ratio of the touch panel is improved. No additional shielding layer is needed between the touch panel and the display screen for shielding the noise of the LCD screen, thus the structure of the LCD apparatus is simplified.

DETAILED DESCRIPTION OF THE INVENTION

Figure 1:
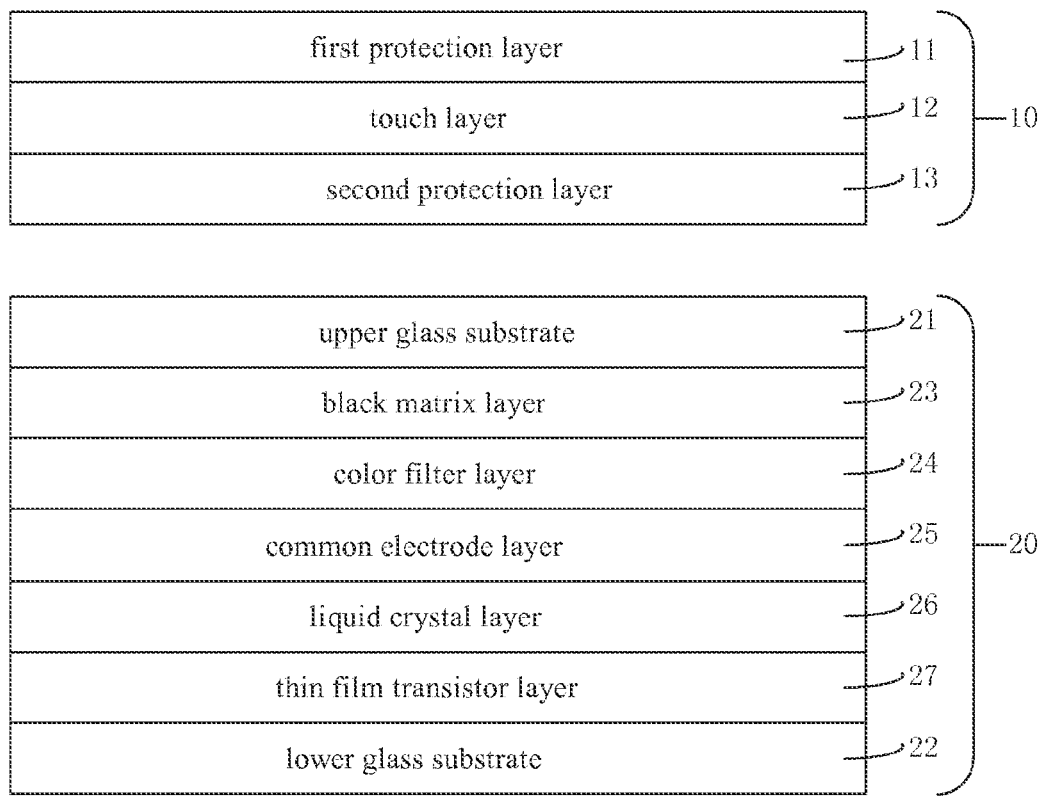
FIG. 1 is a structural schematic diagram of an existing outboard touch panel liquid crystal display (LCD) module.
Figure 2:
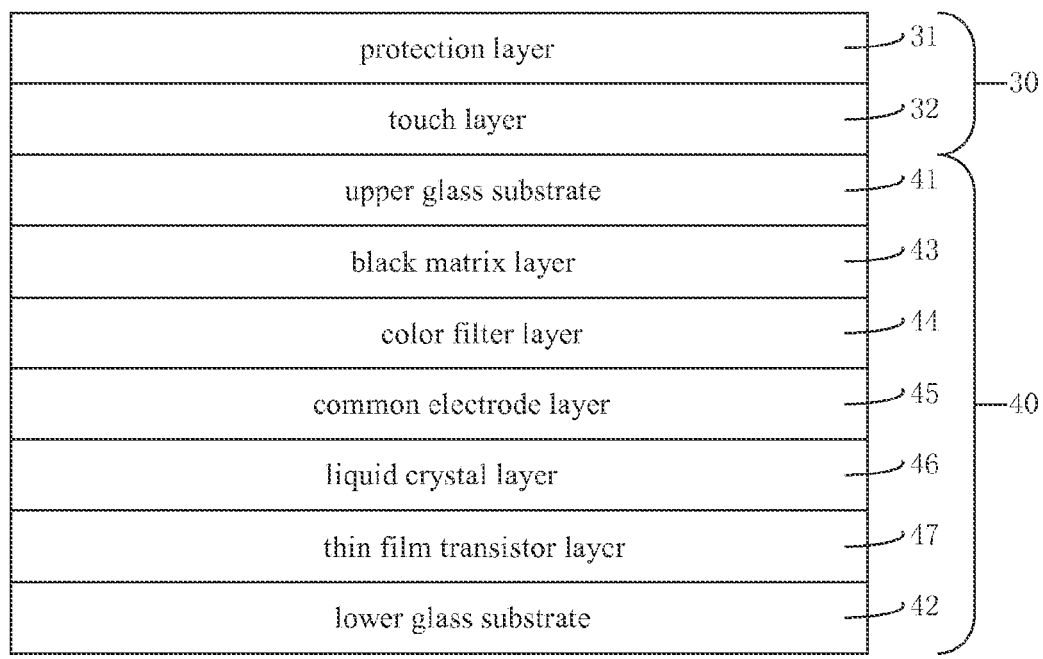
FIG. 2 is a structural schematic diagram of an existing on cell touch panel LCD module.
Figure 3:
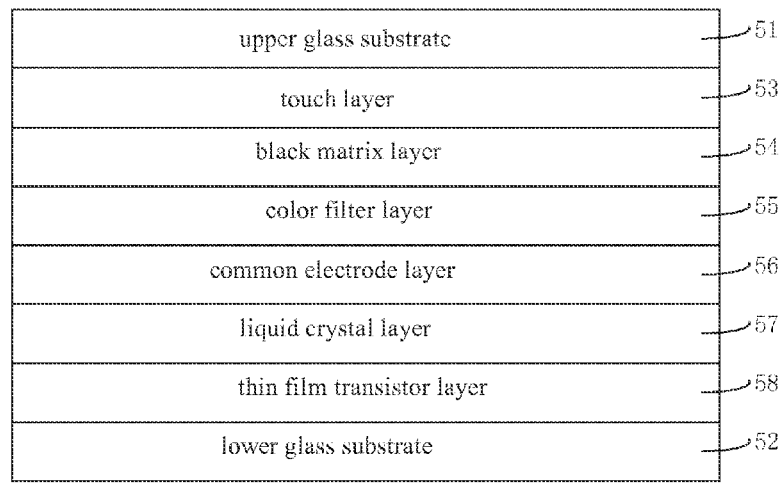
FIG. 3 is a structural schematic diagram of an existing in-cell touch panel LCD module.
Figure 4:
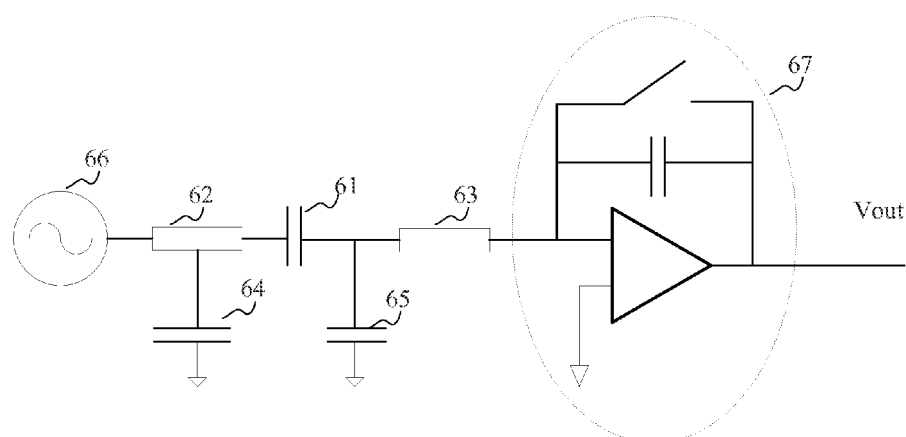
FIG. 4 is an equivalent circuit diagram of a crossing of a driving line and a sensing line in an existing touch layer.
Figure 5:
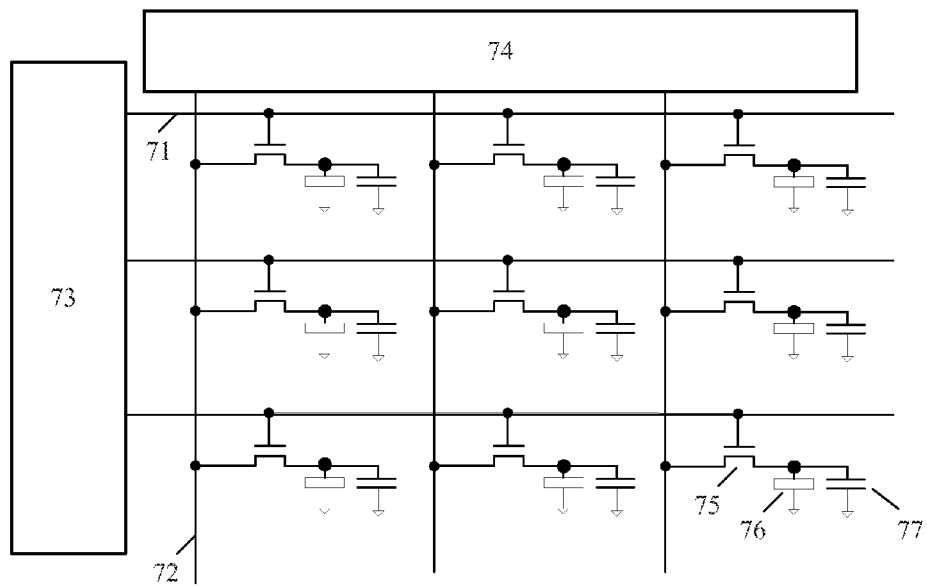
FIG. 5 is a simplified circuit diagram of an existing LCD screen.

In order to solve the problem of low signal-to-noise ratio of the conventional in-cell touch panels, embodiments of the present invention provide an in-cell touch panel liquid crystal display (LCD) module and a method for driving the same. The in-cell touch panel LCD module includes a common electrode layer, a driving line and a sensing line. The common electrode layer includes at least two common electrodes, a first common electrode and a second common electrode. At least a portion of the driving line overlaps with the first common electrode and at least a portion of the sensing line overlaps with the second common electrode. A display signal is applied to the common electrode layer during a display time, and the LCD screen displays an image accordingly. A first touch control signal is applied to the first common electrode and a second touch control signal is applied to the second common electrode during a touch control time, to make the electric potential of the first common electrode equal to that of the driving line and the electric potential of the second common electrode equal to that of the sensing line. In this way, in the touch control time, the first common electrode and the driving line form a capacitor whose two plates having equal electric potentials, and the second common electrode and the sensing line form a capacitor whose two plates having equal electric potentials. Therefore, the noise generated by the LCD screen may be shielded by the touch panel and the signal-to-noise ratio of the touch panel is improved.

The larger the right opposite area between the first common electrode and the driving line is, the more the noise generated by the LCD screen is shielded, and the larger the right opposite area between the second common electrode and the sensing line is, the more the noise generated by the LCD screen is shielded. Therefore, the more the overlapped portion between the driving line and the first common electrode is, the more the noise generated by the LCD screen is shielded, and the more the overlapped portion between the sensing line and the second common electrode is, the more the noise generated by the LCD is shielded. Therefore, preferably, the whole driving line overlaps with the first common electrode and the whole sensing line overlaps with the second common electrode. That is, the right opposite area between the driving line and the first common electrode equals to the area of the first surface of the driving line, and the right opposite area between the sensing line and the second common electrode equals to the area of the second surface of the sensing line. In addition, there is an interval between the first common electrode and the second common electrode, and in order to form a better-quality image on the LCD screen during the display time, the area of the third surface of the first common electrode is equal to or greater than the area of the first surface of the driving line, and the area of the fourth surface of the second common electrode is equal to or greater than the area of the second surface of the sensing line.

Specific embodiments of the present invention will be described below in conjunction with the accompany drawings. It is understood that the described embodiments are illustrative and not restrictive. As those skilled in the art would realize, the described embodiments may be modified in various different ways, all without departing from the spirit or scope of the embodiments.

Figure 6:
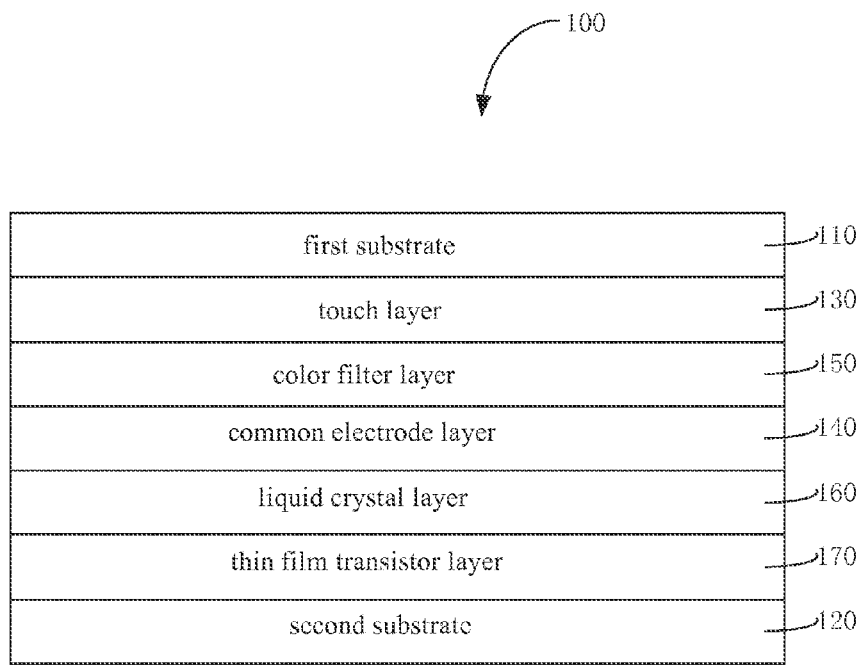
FIG. 6 is a structural schematic diagram of an in-cell touch panel LCD module according to an embodiment of the present invention.
Figure 7:
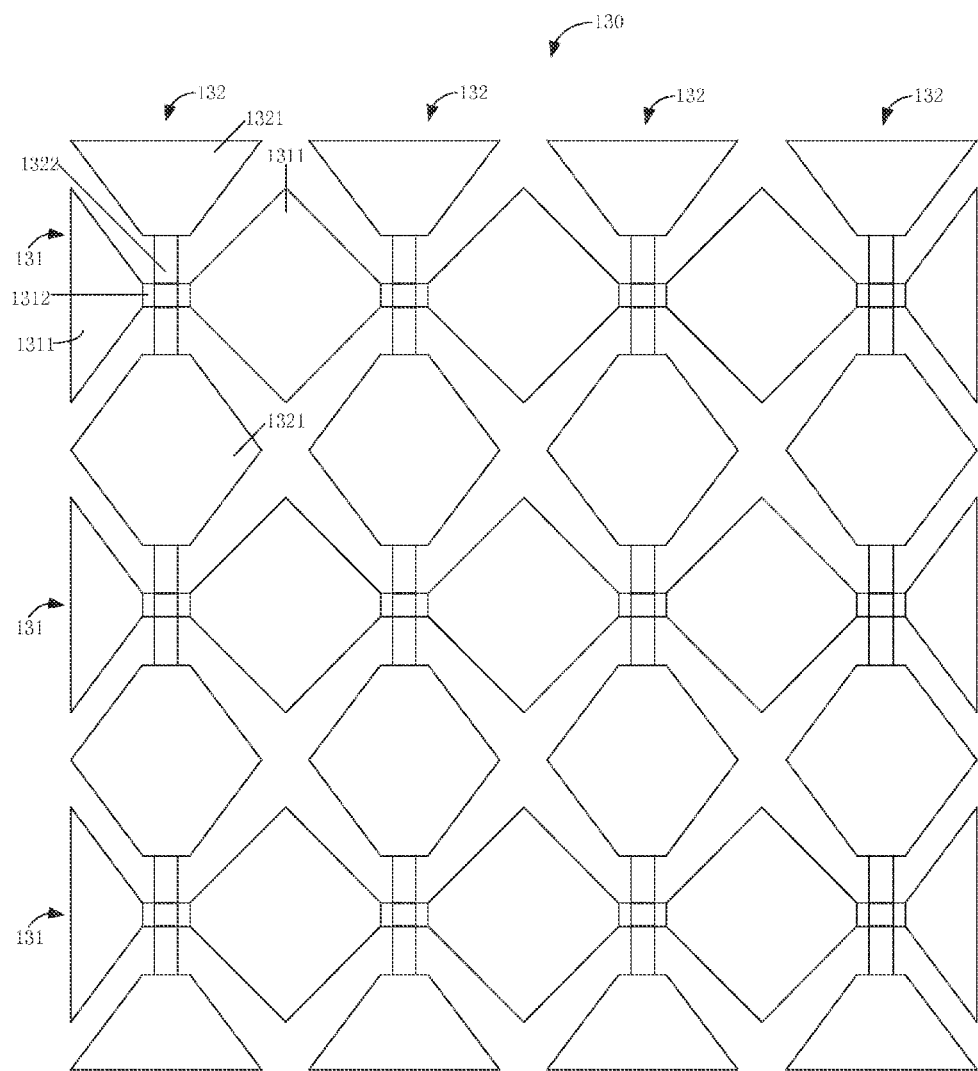
FIG. 7 is a simplified diagram of an arrangement of driving lines and sensing lines in the in-cell touch panel LCD module shown in FIG. 6.

FIG. 6 is a simplified structural diagram of an in-cell touch panel LCD module according to an embodiment of the present invention. FIG. 7 is a simplified diagram of an arrangement of driving lines and sensing lines in the in-cell touch panel LCD module of FIG. 6. As shown in FIG. 6 and FIG. 7, an in-cell touch panel LCD module 100 includes a first substrate 110 and a second substrate 120 which are disposed opposite to each other. In an embodiment, the first substrate 110 and the second substrate 120 are glass substrates. A touch layer 130 is disposed between the first substrate 110 and the second substrate 120. The touch layer 130 may include multiple (two or more) spaced-apart driving lines 131 and multiple (two or more) spaced-apart sensing lines 132, and the driving lines 131 cross the sensing lines 132. In an embodiment, the multiple driving lines 131 are parallel to each other, the multiple sensing lines 132 are parallel to each other, and the driving lines 131 are perpendicular to the sensing lines 132. In an embodiment, the driving lines 131 and the sensing lines 132 are formed of an indium tin oxide material.

It should be understood by those skilled in the art that, in the touch layer 130, the driving lines 131 are disposed at intervals between adjacent sensing lines 132 (the sensing lines 132 are also disposed at intervals between adjacent driving lines 131). Although the driving lines 131 cross the sensing lines 132, intervals exist between the driving lines 131 and the sensing lines 132 with the exception of the overlapped portions. Specifically, each of the driving lines 131 includes multiple (two or more) drive electrode units 1311, and two adjacent drive electrode units 1311 are connected together by a connecting wire 1312. Each of the sensing line 132 includes multiple (two or more) sensing electrode units 1321, and two adjacent sensing electrode units 1321 are connected together by a connecting wire 1322. The connecting wire 1312 crosses the connecting wire 1322 and there is no overlapped portion between the drive electrode units 1311 and the sensing electrode units 1321. In other words, the drive electrode units 1311 are disposed at the intervals between two adjacent sensing lines 132, and the connecting wire 1312 crosses the sensing line 132; the sensing electrode units 1321 are disposed at the intervals between two adjacent driving lines 131, and the connecting wire 1322 crosses the driving line 131.

Figure 8:
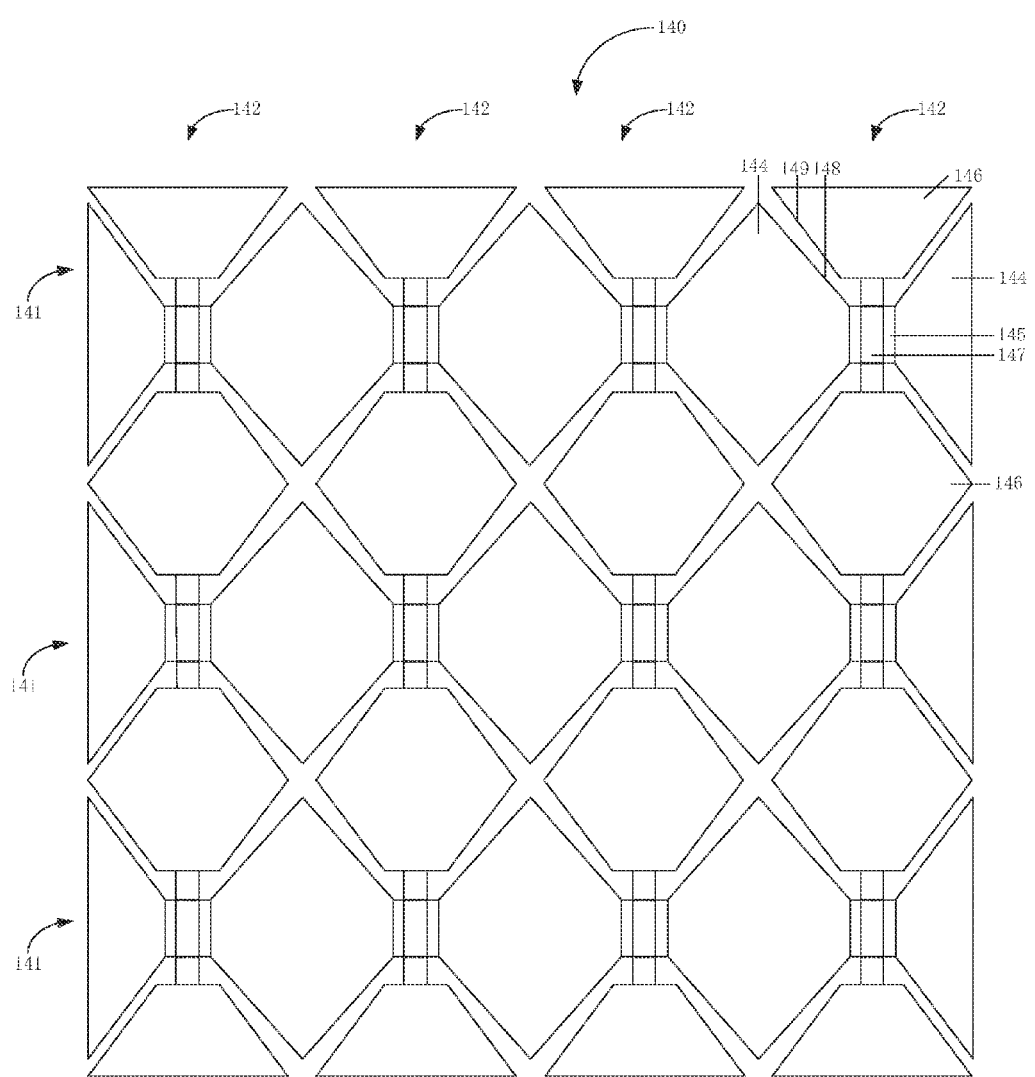
FIG. 8 is a structural schematic diagram of a common electrode layer in the in-cell touch panel LCD module shown in FIG. 6.
Figure 9:
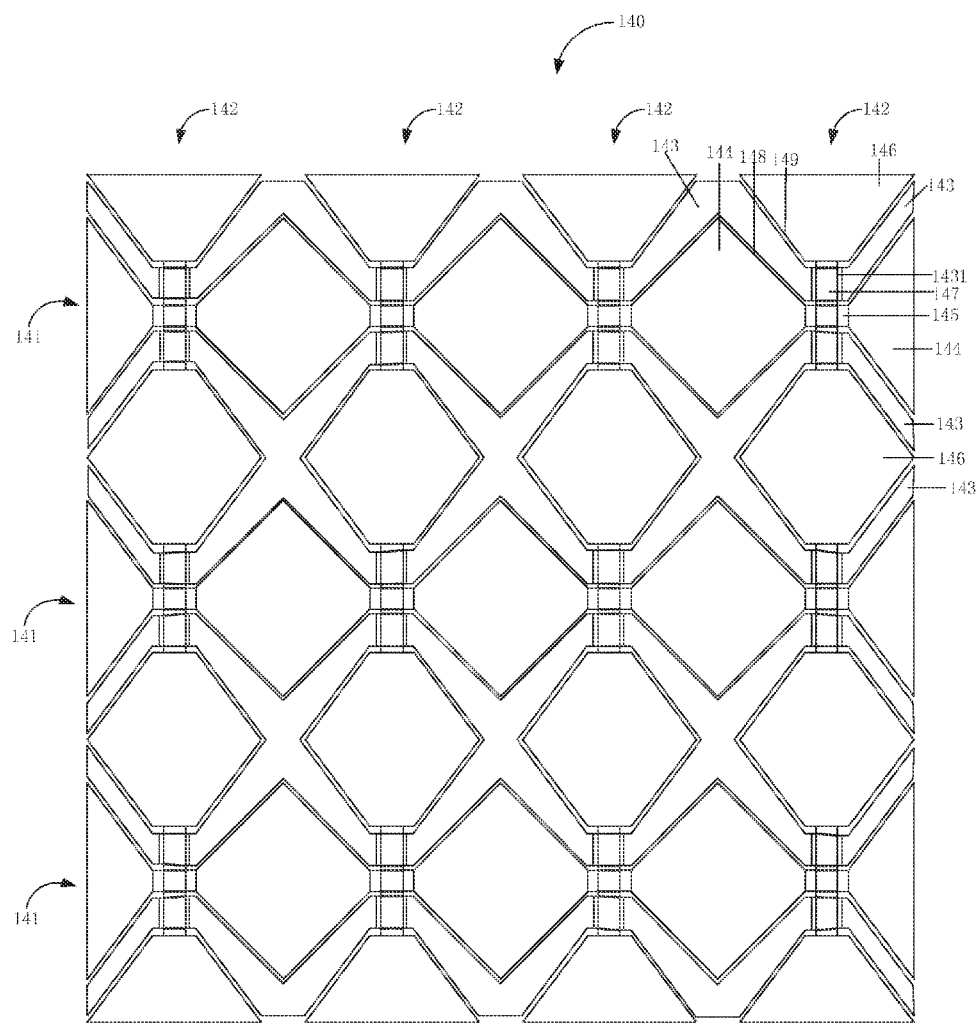
FIG. 9 is a structural schematic diagram of another common electrode layer in the in-cell touch panel LCD module shown in FIG. 6.

FIG. 8 is a structural schematic diagram of a common electrode layer in the in-cell touch panel LCD module of FIG. 6. FIG. 9 is a simplified structural diagram of another common electrode layer in the in-cell touch panel LCD module of FIG. 6. In conjunction with FIG. 6 to FIG. 9, a common electrode layer 140 is further disposed between the first substrate 110 and the second substrate 120, and the common electrode layer 140 is located below the touch layer 130. The common electrode layer 140 includes multiple (two or more) spaced-apart first common electrodes 141 and multiple (two or more) spaced-apart second common electrodes 142.

Although there is an interval between the driving line 131 and the first common electrode 141, at least a portion of the driving line 131 overlaps with the first common electrode 141. In addition, both the first common electrode 141 and the driving line 131 are conductive, and thus the first common electrode 141 and the driving line 131 form a capacitor in the in-cell touch panel LCD apparatus, and the first common electrode 141 and the driving line 131 are two plates of the capacitor respectively. The first common electrode 141 has a third surface facing the driving line 131, the driving line 131 has a first surface facing the first common electrode 141, and the exact opposite area between the two plates of the capacitor is not larger than the area of the first surface of the driving line 131. In the case where only part of the driving line 131 overlaps with the first common electrode 141, the exact opposite area between the two plates of the capacitor is less than the area of the first surface of the driving line 131; and in the case where the driving line 131 completely overlaps with the first common electrode 141, the exact opposite area between the two plates of the capacitor equals to the area of the first surface of the driving line 131.

Although there is an interval between the sensing line 132 and the second common electrode 142, at least part of the sensing line 132 overlaps with the second common electrode 142. In addition, both of the second common electrode 142 and the sensing line 132 are conductive, and thus the second common electrode 142 and the sensing line 132 also form a capacitor in the in-cell touch panel LCD apparatus, and the second common electrode 142 and the sensing line 132 are two plates of the capacitor respectively. The second common electrode 142 has a fourth surface facing the sensing line 132, the sensing line 132 has a second surface facing the second common electrode 142, and the right opposite area between the two plates of the capacitance is not larger than the area of the second surface of the sensing line 132. In the case where only a portion of the sensing line 132 overlaps with the second common electrode 142, the exact opposite area between the two plates of the capacitor is less than the area of the second surface of the sensing line 132; and in the case where the whole sensing line 132 overlaps with the second common electrode 142, the exact opposite area between the two plates of the capacitor equals to the area of the second surface of the sensing line 132.

In addition, the first common electrode 141 is disposed at the interval between two adjacent second common electrodes 142 (the second common electrode 142 is also disposed at the interval between two adjacent first common electrodes 141), and the first common electrodes 141 cross the second common electrode 142. It should be noted that the first common electrodes 141 and the second common electrodes 142 are electrically isolated from each other, thus electric signals may be applied respectively to the first common electrode 141 and the second common electrode 142.

In an embodiment, the first common electrode 141 includes multiple (two or more) first electrode units 144 and first connecting wires 145 connecting two adjacent first electrode units 144 with each other. The second common electrode 142 includes multiple (two or more) second electrode units 146 and second connecting wires 147 connecting two adjacent second electrode units 146 with each other. The first electrode units 144 are disposed at intervals between two adjacent second common electrodes 142, and the first connecting wires 145 cross the second common electrodes 142. The second electrode unit 146 is disposed at intervals between two adjacent first common electrodes 141, and the second connecting wires 147 cross the first common electrode 141. Therefore, intervals exist between the edge sidewalls 148 of the first electrode unit 144 and the edge sidewalls 149 of the second electrode unit 146, so as to ensure that the first common electrode 141 and the second common electrode 142 are electrically isolated, therefore, different electric signals may be applied to the first common electrode 141 and the second common electrode 142 respectively. The first connecting wires 145 cross the second connecting wire 147, and in order to ensure that the first common electrode 141 and the second common electrode 142 are electrically isolated, insulation material (not shown) needs to be disposed at least at the crossing positions of the first connecting wires 145 and the second connecting wires 147.

It should be noted that the shape of the first electrode unit 144 in the first common electrode 141 and the shape of the second electrode unit 146 in the second common electrode 142 are not limited to the shapes shown in the drawings. In some embodiments, the shapes of the first electrode unit 144 and the second electrode unit 146 may be rectangular, square, hexagonal, diamond, and others.

The in-cell touch panel LCD module 100 further includes a control circuit (not shown). The control circuit may divide the time of each frame for the LCD screen into a display time and a touch control time. The control circuit supplies a display signal to the common electrode layer 140 during the display time, and an electric signal is also applied to a pixel electrode (not shown) of the in-cell touch panel LCD module 100. Due to the electric potential difference between the common electrode layer 140 and the pixel electrode, an electric field is generated, and liquid crystal molecules rotate in accordance with the electric field, enabling the LCD screen to display an image. In the present invention, the common electrode layer 140 consists of multiple (two or more) independent common electrodes, the whole common electrode layer 140 needs to be applied with the electric signals (that is, all the common electrodes in the common electrode layer need to be applied with the electric signals), and each of the common electrode should be applied with the same electric signal. During the touch control time period, the control circuit applies a first touch control signal to the first common electrode 141 in the common electrode layer 140, and a second touch control signal to the second common electrode 142 in the common electrode layer 140. The first touch control signal causes the electric potential of the first common electrode 141 to be equal to that of the driving line 131, and the second touch control signal causes the electric potential of the second common electrode 142 to be equal to that of the sensing line 132. In this way, the first common electrode 141 and the driving line 131 form a capacitor whose two plates having equal electric potentials, and the second common electrode 142 and the sensing line 132 also form a capacitor whose two plates having equal electric potentials. Thus, the noise generated by the LCD screen may be shielded.

The larger the right (exact) opposite area between the first common electrode 141 and the driving line 131 is, the more the noise generated by the LCD screen is shielded. Similarly, the larger the right (exact) opposite area between the second common electrode 142 and the sensing line 132 is, the more the noise generated by the LCD screen is shielded. Therefore, the more the overlapped portion between the driving line 131 and the first common electrode 141 is, the more the noise generated by the LCD screen is shielded. Similarly, the more the overlapped portion between the sensing line 132 and the second common electrode 142 is, the more the noise generated by the LCD screen is shielded. Therefore, in a preferable embodiment of the present invention, the whole driving line 131 overlaps with the first common electrode 141 and the whole sensing line 132 overlaps with the second common electrode 142. In this way, the right opposite area between the driving line 131 and the first common electrode 141 equals to the area of the first surface of the driving line 131 and at least equals to the area of the third surface of the first common electrode 141. The right opposite area between the sensing line 132 and the second common electrode 142 equals to the area of the second surface of the sensing line 132 and at least equals to the area of the fourth surface of the second common electrode 142.

The working principle of the LCD screen is that, when applying electric signals to the common electrode layer 140 and the pixel electrode simultaneously to form an electric potential difference between the common electrode layer 140 and the pixel electrode, and the liquid crystal molecules in the display screen may rotate in accordance with the electric potential difference, thus light can pass through intervals between the liquid crystal molecules and an image can be formed. The common electrode layer 140 includes at least two independent common electrodes, i.e., the first common electrode 141 and the second common electrode 142, and there are intervals between the common electrodes of the common electrode layer 140. Therefore, in order to enable the liquid crystal molecules under the intervals between the two common electrodes to be deflected under the electric potential difference between the common electrodes and the pixel electrode so as to form a better-quality image, it is necessary to make the intervals between the common electrodes of the common electrode layer 140 as small as possible. In addition, during the touch control time, in order to shield more noise generated by the LCD screen, the area of the third surface of the first common electrode 141 is at least equal to the area of the first surface of the driving line 131 and the area of the fourth surface of the second common electrode 142 is at least equal to the area of the second surface of the sensing line 132. From the above, it is set that the area of the third surface of the first common electrode 141 in the common electrode layer 140 is not less than the area of the first surface of the driving line 131, and the area of the fourth surface of the second common electrode 142 in the common electrode layer 140 is not less than the area of the second surface of the sensing line 132.

Based on all the above embodiments of the in-cell touch panel LCD module, a specific embodiment is shown in FIG. 8. The common electrode layer 140 consists of the first common electrode 141 and the second common electrode 142. The area of the third surface of the first common electrode 141 is larger than the area of the first surface of the driving line 131, and the area of the fourth surface of the second common electrode 142 is larger than the area of the second surface of the sensing line 132. It should be noted that in such structure of the common electrode layer 140, there are intervals between the edge sidewalls 148 of the first electrode units 144 of the first common electrodes 141 and the edge sidewalls 149 of the second electrode units 146 of the second common electrodes 142, so as to ensure that the first common electrode 141 and the second common electrode 142 are electrically isolated.

Another embodiment is shown in FIG. 9. The common electrode layer 140 consists of the first common electrode 141, the second common electrode 142 and the third common electrode 143. The area of the third surface of the first common electrode 141 equals to the area of the first surface of the driving line 131, and the area of the fourth surface of the second common electrode 142 equals to the area of the second surface of the sensing line 132. The third common electrodes 143 are disposed at intervals between the first common electrodes 141 and the second common electrodes 142, and there are intervals among the third common electrodes 143, the first common electrodes 141 and the second common electrodes 142, so as to ensure that the first common electrode 141, the second common electrode 142 and the third common electrode 143 are electrically isolated from each other. In other words, in such structure of the common electrode layer 140, intervals exist between the third common electrodes 143 and the edge sidewalls 148 of the first electrode units 144 of the first common electrodes 141 and between the third common electrodes 143 and the edge sidewalls 149 of the second electrode units 146 of the second common electrodes 142. As a specific embodiment, the third common electrodes 143 located in the intervals between the first common electrodes 141 and the second common electrodes 142 are connected together by third connecting wires 1431, thus the electric signal may be applied to the third common electrodes 143 in the same row simultaneously. Since the first common electrode 141, the second common electrode 142 and the third common electrode 143 are electrically isolated from each other, insulation material (not shown) needs to be disposed at crossing positions of the third connecting wires 1431 and the first common electrodes 141 and crossing positions of the third connecting wires 1431 and the second common electrodes 142.

In other embodiments, in the case where the area of the third surface of the first common electrode 141 in the common electrode layer 140 is larger than the area of the first surface of the driving line 131 and the area of the fourth surface of the second common electrode 142 in the common electrode layer 140 is larger than the area of the second surface of the sensing line 132, the third common electrodes 143 may be disposed at the intervals between the first common electrodes 141 and the second common electrodes 142 according to the interval size between the first common electrodes 141 and the second common electrodes 142. In other embodiments, in the case where the area of the third surface of the first common electrode 141 in the common electrode layer 140 equals to the area of the first surface of the driving line 131, the area of the fourth surface of the second common electrode 142 in the common electrode layer 140 equals to the area of the second surface of the sensing line 132, and the third common electrodes 143 are disposed at the intervals between the first common electrodes 141 and the second common electrodes 142, the third common electrode 143 may be divided into two independent common electrodes, but this will make the manufacture of the common electrode layer 140 difficult. The structure of the common electrode layer 140 in the present invention is not limited to the above embodiments.

In the case where the common electrode layer 140 consists of the first common electrode 141 and the second common electrode 142, the same display signal is applied to the first common electrode 141 and the second common electrode 142 during the display time, that is, the first common electrode 141 and the second common electrode 142 have equal electric potentials; and a first touch control signal is applied to the first common electrode 141 and a second touch control signal is applied to the second common electrode 142 during the display time, to make the first common electrode 141 have an electric potential equal to that of the driving line 131 and the second common electrode 142 have an electric potential equal to that of the sensing line 132.

In the case where the common electrode layer 140 consists of the first common electrode 141, the second common electrode 142 and the third common electrode 143, the same display signal is applied to the first common electrode 141, the second common electrode 142 and the third common electrode 143 during the display time, that is, the first common electrode 141, the second common electrode 142 and the third common electrode 143 have equal electric potentials; and a first touch control signal is applied to the first common electrode 141 and a second touch control signal is applied to the second common electrode 142 during the display time, to make the first common electrode 141 have an electric potential equal to that of the driving line 131 and the second common electrode 142 have an electric potential equal to that of the sensing line 132. In this case, the third common electrode 143 may be applied without an electrical signal, or may be applied with a third touch control signal. Independently whether the third common electrode 143 is applied with an electrical signal or whatever signal is applied to the third common electrode 143, the operation of the touch panel will not be affected. Since a display signal is applied to the third common electrode 143 during the display time, in order to simplify the control circuit of the whole in-cell touch panel LCD module, a third touch control signal which is the same as the display signal is applied to the third common electrode 143 during the touch control time, so the signal applied to the third common electrode 143 during the display time is the same as the signal applied to the third common electrode 143 during the touch control time.

In an embodiment, the control circuit includes a display signal generating unit, a touch control signal generating unit and a switch unit. The touch control signal generating unit includes at least a first touch control signal generating subunit and a second touch control signal generating subunit. The switch unit connects the common electrode layer 140 to the display signal generating unit (each of the common electrodes in the common electrode layer 140 is connected to the display signal generating unit) during the display time; and connects the common electrode layer 140 to the touch control signal generating unit during the touch control time, which includes connecting the first common electrode 141 to the first touch control signal generating subunit and connecting the second common electrode 142 to the second touch control signal generating subunit.

In the case where the common electrode layer 140 consists of the first common electrode 141, the second common electrode 142 and the third common electrode 143, and a third touch control signal is applied to the third common electrode 143 during the touch control time, the touch control signal generating unit further includes a third touch control signal generating subunit in addition to the first touch control signal generating subunit and the second touch control signal generating subunit.

According to the above-described embodiments of the in-cell touch panel LCD module, an in-cell touch panel LCD module 100 as shown in FIG. 6 further includes a color filter layer 150 disposed between the first substrate 110 and the second substrate 120, a liquid crystal layer 160 disposed between the color filter layer 150 and the second substrate 120 and a TFT layer 170 disposed between the liquid crystal layer 160 and the second substrate 120. The common electrode layer 140 may be disposed between the color filter layer 150 and the liquid crystal layer 160 or between the liquid crystal layer 160 and the second substrate 120 (not shown in the drawings). In the case where the common electrode layer 140 is disposed between the color filter layer 150 and the liquid crystal layer 160, the display mode of the in-cell touch panel LCD module 100 is a twist nematic (TN) mode or a vertical alignment (VA) mode. In the case where the common electrode layer 140 is disposed between the liquid crystal layer 160 and the second substrate 120, the display mode of the in-cell touch panel LCD module 100 is an in plane switching (IPS) mode. The position of the common electrode layer 140 may be set as required by the in-cell touch panel LCD module 100.

Figure 10:
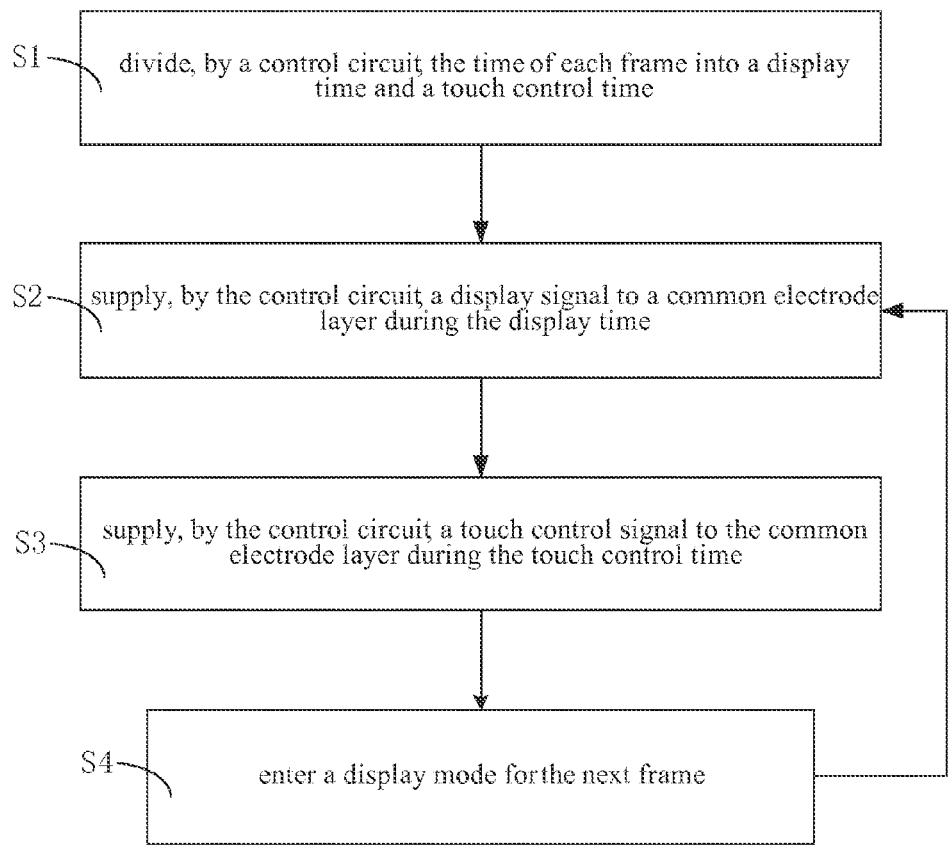
FIG. 10 is a flowchart diagram of an embodiment of a driving method for driving an in-cell touch panel LCD module according to the present invention.

FIG. 10 is a flowchart diagram of a driving method for driving an in-cell touch panel LCD module according to an embodiment of the present invention. In conjunction with FIG. 5 to FIG. 10, the method includes the following steps.

Step S1: dividing, by the control circuit, the time period of each frame into a display time period and a touch control time period.

Firstly, a gate electrode drive pulse with an appropriate pulse width is selected according to the performance of the pixel on-off switch, i.e., a TFT, of each pixel in the LCD array of the LCD screen, and a display time period, i.e., minimum imaging time for displaying a frame of image is determined. The value of the minimum imaging time is obtained by multiplying the pulse width of the gate electrode drive pulse by the number of the rows of the pixels in the LCD array, and the value is less than the standard time of each frame, with the remaining time being used as the touch control time.

Next, the time sequence of the display time period and the touch control time period in the time period of each frame is determined. In the embodiment, the display time period is before the touch control time period within the time period of each frame, that is, the LCD array is switched into a touch control mode at a predetermined time after imaging and displaying. In other embodiment, the display time period is after the touch control time period within the time period of each frame, that is, the LCD array is in the touch control mode firstly and then performs imaging and displaying at a predetermined time.

Step S2: supplying, by the control circuit, a display signal to the common electrode layer during the display time.

The process is as follows. The switch unit of the control circuit connects the common electrode layer 140 to the display signal generating unit during the display time, and the display signal generating unit applies the display signal to the common electrode layer 140. The gate electrode drive circuit 73 generates a pixel selecting signal which is transmitted to the pixel on-off switches 75 line by line through the gate electrode wires 71. The voltage across the gate electrode of the pixel on-off switch 75 is larger than the turn-on voltage of the pixel on-off switch 75, so as to turn on the pixel on-off switches 75 line by line. Also, the source electrode drive circuit 74 applies voltages to the source electrodes of the pixel on-off switches 75 through the source electrode wires 72 to complete imaging and displaying.

In the case where the common electrode layer 140 consists of a first common electrode 141 and a second common electrode 142, the display signal generating unit applies the same display signal to the first common electrode 141 and the second common electrode 142. In the case where the common electrode layer 140 consists of the first common electrode 141, the second common electrode 142 and a third common electrode 143, the display signal generating unit applies the same display signal to the first common electrode 141, the second common electrode 142 and the third common electrode 143.

Step S3: supplying, by the control circuit, a touch control signal to the common electrode layer during the touch control time period.

The process is as follows. The in-cell touch panel LCD module is switched into the touch control mode after imaging and displaying of a frame for all the display pixels in the LCD array. The switch unit of the control circuit connects the common electrode layer 140 to the touch control signal generating unit, and the touch control signal generating unit applies a touch control signal to the common electrode layer 140. The touch control signal generating unit includes at least a first touch control signal generating subunit and a second touch control signal generating subunit. The first touch control signal generating subunit may be connected to the first common electrode 141, and the second touch control signal generating subunit may be connected to the second common electrode 142. In the case where the common electrode layer 140 consists of the first common electrode 141, the second common electrode 142 and the third common electrode 143, and a third touch control signal is applied to the third common electrode 143 during the touch control time, the touch control signal generating unit further includes a third touch control signal generating subunit in addition to the first touch control signal generating subunit and the second touch control signal generating subunit, and the third touch control signal generating subunit may be connected to the third common electrode 143.

In the case where the common electrode layer 140 consists of the first common electrode 141 and the second common electrode 142, the first touch control signal generating subunit applies a first touch control signal to the first common electrode 141, and the second touch control signal generating subunit applies a second touch control signal to the second common electrode 142, so that the electric potential of the first common electrode 141 equals to that of the driving line 131, and the electric potential of the second common electrode 142 equals to that of the sensing line 132. In the case where the common electrode layer 140 consists of the first common electrode 141, the second common electrode 142 and the third common electrode 143, the first touch control signal generating subunit applies a first touch control signal to the first common electrode 141, and the second touch control signal generating subunit applies a second touch control signal to the second common electrode 142, so that the electric potential of the first common electrode 141 equals to that of the driving line 131, and the electric potential of the second common electrode 142 equals to that of the sensing line 132. In this case, the third common electrode 143 may be or may not be applied with an electrical signal. The display signal is applied to the third common electrode 143 during the display time, therefore, in order to simplify the control circuit of the whole in-cell touch panel LCD module, a third touch control signal which is the same as the display signal is applied to the third common electrode 143 during the touch control time period.

Since the electric potential of the first common electrode 141 equals to that of the driving line 131 and the electric potential of the second common electrode 142 equals to that of the sensing line 132 during the touch control time, the noise interference generated by the LCD screen may be shielded and the signal-to-noise ratio of the touch panel may be improved. The larger the right opposite area between the first common electrode 141 and the driving line 131 is, the more the noise interference may be shielded, and the larger the right opposite area between the second common electrode 142 and the sensing line 132 is, the more the noise interference may be shielded.

Preferably, the gate electrode of the pixel on-off switch is controlled to be in an off state during the touch control time, so that the pixel electrode may be in a floating state. Thus the noise interference of the LCD screen may be further reduced and the signal-to-noise ratio of the touch panel may be improved. In addition, when the pixel electrode is in the floating state, the voltage of the pixel electrode will not be changed and the imaging quality will not be affected.

Step S4: the process proceeds to Step S2 to enter a display mode for next frame display, where a display signal is applied to the common electrode layer to display the next frame of image. The above steps are repeated.

In summary, the present invention has many advantages over the prior art.

The time period of one frame of the in-cell touch panel LCD module is divided into the display time period and the touch control time period. A display signal is applied to the common electrode layer during the display time period, so that the LCD screen can display an image normally. A first touch control signal is applied to the first common electrode in the common electrode layer and a second touch control signal is applied to the second common electrode in the common electrode layer during the touch control time period, so that the electric potential of the first common electrode equals to that of the driving line and the electric potential of the second common electrode equals to that of the sensing line. Since at least a portion of the driving line overlaps with the first common electrode and at least a portion of the sensing line overlaps with the second common electrode, the first common electrode and the driving line form a capacitor, the second common electrode and the sensing line form a capacitor, and the electric potentials of the two plates of each of the two capacitors are the same. Therefore, at least a portion of the noise generated by the LCD screen may be shielded, and the signal-to-noise ratio of the touch panel may be improved. In addition, no extra shielding layer is needed between the touch panel and the display screen for shielding the noise of the LCD screen, so the structure of the LCD apparatus is simplified. The larger the right (exact) opposite area between the first common electrode and the driving line is, the more the noise interference may be shielded, and the larger the right opposite area between the second common electrode and the sensing line is, the more the noise interference may be shielded.

In the case where the gate electrode of the pixel on-off switch is in the off state during the touch control time, the pixel electrode may be in the floating state. Thus, the noise interference of the LCD screen may be further reduced and the signal-to-noise ratio of the touch panel may be improved. In addition, when the pixel electrode is in the floating state, the voltage of the pixel electrode will not be changed and the image quality will not be affected.

Those skilled in the art can understand better and implement the present invention from the above description of the embodiments. It is obvious that various changes and modifications may be made to the above embodiments by those skilled in the art in light of the principle disclosed herein without departing from the spirit and the scope of the present invention. Therefore, the present invention is not limited to the embodiments described herein, and the protection scope of the present invention should be defined according to the appended claims.

What is claimed is:

1. An in-cell capacitive touch panel Liquid Crystal Display (LCD) module, comprising:
   a first substrate and a second substrate disposed opposite to each other;
   a plurality of spaced-apart driving lines and a plurality of spaced-apart sensing lines disposed between the first substrate and the second substrate, wherein the driving lines cross the sensing lines;
   a common electrode layer disposed between the first substrate and the second substrate and located below the driving lines and the sensing lines, wherein
      the common electrode layer comprises a plurality of spaced-apart first common electrodes and a plurality of spaced-apart second common electrodes;
      at least a portion of the driving line overlaps with the first common electrode, and at least a portion of the sensing line overlaps with the second common electrode;
      the first common electrode is disposed at an interval between two adjacent second common electrodes; and
      the first common electrodes cross the second common electrodes and are electrically isolated from the second common electrodes; and
   a control circuit adapted to divide a time period of each frame into a display time period and a touch control time period, supply a display signal to the common electrode layer during the display time period, supply a first touch control signal to the first common electrode, and supply a second touch control signal to the second common electrode during the touch control time period, wherein the first touch control signal causes the first common electrode to have an electric potential equal to an electric potential of the driving line, and the second touch control signal causes the second common electrode to have an electric potential equal to an electric potential of the sensing line.

2. The in-cell capacitive touch panel LCD module according to claim 1, wherein
   the driving line has a first surface facing the first common electrode, the sensing line has a second surface facing the second common electrode, the first common electrode has a third surface facing the driving line, and the second common electrode has a fourth surface facing the sensing line; and
   the driving line completely overlaps with the first common electrode, and the sensing line completely overlaps with the second common electrode.

3. The in-cell capacitive touch panel LCD module according to claim 2, wherein the third surface of the first common electrode has an area equal to or greater than an area of the first surface of the driving line, and the fourth surface of the second common electrode has an area equal to or greater than an area of the second surface of the sensing line.

4. The in-cell capacitive touch panel LCD module according to claim 3, further comprising a color filter layer disposed between the first substrate and the second substrate, a liquid crystal layer disposed between the color filter layer and the second substrate, and a thin film transistor layer disposed between the liquid crystal layer and the second substrate, wherein the common electrode layer is disposed between the color filter layer and the liquid crystal layer or between the liquid crystal layer and the second substrate.

5. The in-cell capacitive touch panel LCD module according to claim 2, further comprising:
   a color filter layer disposed between the first substrate and the second substrate;
   a liquid crystal layer disposed between the color filter layer and the second substrate; and
   a thin film transistor layer disposed between the liquid crystal layer and the second substrate, wherein the common electrode layer is disposed between the color filter layer and the liquid crystal layer or between the liquid crystal layer and the second substrate.

6. The in-cell capacitive touch panel LCD module according to claim 1, wherein:
   the first common electrode comprises a plurality of first electrode units and a plurality of first connecting wires electrically connecting two adjacent first electrode units together;
   the second common electrode comprises a plurality of second electrode units and a plurality of second connecting wires electrically connecting two adjacent second electrode units together;
   an interval is between an edge sidewall of a first electrode unit and an edge sidewall of a second electrode unit; and
   the first connecting wires cross the second connecting wires.

7. The in-cell capacitive touch panel LCD module according to claim 6, further comprising:
   a color filter layer disposed between the first substrate and the second substrate;
   a liquid crystal layer disposed between the color filter layer and the second substrate; and
   a thin film transistor layer disposed between the liquid crystal layer and the second substrate;
   wherein the common electrode layer is disposed between the color filter layer and the liquid crystal layer or between the liquid crystal layer and the second substrate.

8. The in-cell capacitive touch panel LCD module according to claim 1, wherein the control circuit comprises:
   a display signal generating unit;
   a touch control signal generating unit; and
   a switch unit;
   the touch control signal generating unit including a first touch control signal generating subunit and a second touch control signal generating subunit;
   the switch unit being adapted to connect the common electrode layer to the display signal generating unit during the display time period and the common electrode layer to the touch control signal generating unit during the touch control time period;
   the first common electrode being connected to the first touch control signal generating subunit; and
   the second common electrode being connected to the second touch control signal generating subunit.

9. The in-cell capacitive touch panel LCD module according to claim 8, further comprising:
   a color filter layer disposed between the first substrate and the second substrate;
   a liquid crystal layer disposed between the color filter layer and the second substrate; and
   a thin film transistor layer disposed between the liquid crystal layer and the second substrate;
   wherein the common electrode layer is disposed between the color filter layer and the liquid crystal layer or between the liquid crystal layer and the second substrate.

10. The in-cell capacitive touch panel LCD module according to claim 1, wherein the common electrode layer is an indium tin oxide layer.

11. The in-cell capacitive touch panel LCD module according to claim 10, further comprising:
   a color filter layer disposed between the first substrate and the second substrate;
   a liquid crystal layer disposed between the color filter layer and the second substrate; and
   a thin film transistor layer disposed between the liquid crystal layer and the second substrate;
   wherein the common electrode layer is disposed between the color filter layer and the liquid crystal layer or between the liquid crystal layer and the second substrate.

12. The in-cell capacitive touch panel LCD module according to claim 1, further comprising:
   a color filter layer disposed between the first substrate and the second substrate;
   a liquid crystal layer disposed between the color filter layer and the second substrate; and
   a thin film transistor layer disposed between the liquid crystal layer and the second substrate;
   wherein the common electrode layer is disposed between the color filter layer and the liquid crystal layer or between the liquid crystal layer and the second substrate.

13. A method for driving an in-cell capacitive touch panel LCD module, wherein the in-cell capacitive touch panel LCD module comprises:
   a first substrate and a second substrate disposed opposite to each other;
   a plurality of spaced driving lines and a plurality of spaced sensing lines disposed between the first substrate and the second substrate, wherein the driving lines cross the sensing lines;
   a common electrode layer disposed between the first substrate and the second substrate and located below the driving lines and the sensing lines,
   the common electrode layer comprises a plurality of spaced first common electrodes and a plurality of spaced second common electrodes;
   at least part of the driving line overlaps with the first common electrode, and at least part of the sensing line overlaps with the second common electrode;
   the first common electrode is disposed at an interval between two adjacent second common electrodes; and
   the first common electrodes cross the second common electrodes and the first common electrodes are electrically isolated from the second common electrodes; and
   a control circuit,
   the method comprising:
   dividing, by the control circuit, a time period of each frame into a display time period and a touch control time period;
   supplying, by the control circuit, a display signal to the common electrode layer during the display time period; and
   supplying, by the control circuit, a first touch control signal to the first common electrode and a second touch control signal to the second common electrode during the touch time period, wherein the first touch control signal causes the first common electrode to have an electric potential equal to an electric potential of the driving line, and wherein the second touch control signal causes the second common electrode to have an electric potential equal to an electric potential of the sensing line.

14. The driving method according to claim 13, wherein the display time period is before or after the touch control time period within the time period of each frame.

15. The driving method according to claim 13, wherein the in-cell capacitive touch panel LCD module further comprises a pixel on-off switch disposed on the second substrate, and a gate electrode of the pixel on-off switch is in an off state during the touch control time period.

16. The method for driving the in-cell capacitive touch panel LCD module according to claim 8, wherein the driving line has a first surface facing the first common electrode, the sensing line has a second surface facing the second common electrode, the first common electrode has a third surface facing the driving line, and the second common electrode has a fourth surface facing the sensing line; and the driving line completely overlaps with the first common electrode and the sensing line completely overlaps with the second common electrode.

17. The method for driving the in-cell capacitive touch panel LCD module according to claim 13, wherein the third surface of the first common electrode has an area equal to or greater than an area of the first surface of the driving line, and the fourth surface of the second common electrode has an area equal to or greater than an area of the second surface of the sensing line.

18. The method for driving the in-cell capacitive touch panel LCD module according to claim 13, wherein:

the first common electrode comprises a plurality of first electrode units and a plurality of first connecting wires electrically connecting two adjacent first electrode units with each other;

the second common electrode comprises a plurality of second electrode units and a plurality of second connecting wires electrically connecting two adjacent second electrode units together;

an interval is between an edge sidewall of a first electrode unit and an edge sidewall of a second electrode unit; and the first connecting wires cross the second connecting wires.

19. The method for driving the in-cell capacitive touch panel LCD module according to claim 13, wherein the control circuit comprises a display signal generating unit, a touch control signal generating unit and a switch unit;

the touch control signal generating unit including a first touch control signal generating subunit and a second touch control signal generating subunit;

the switch unit being adapted to connect the common electrode layer to the display signal generating unit during the display time period and the common electrode layer to the touch control signal generating unit during the touch control time period;

the first common electrode being connected to the first touch control signal generating subunit; and the second common electrode being connected to the second touch control signal generating subunit.

20. The method for driving the in-cell capacitive touch panel LCD module according to claim 13, the common electrode layer is an indium tin oxide layer.

* * * * *

UNITED STATES PATENT AND TRADEMARK OFFICE
CERTIFICATE OF CORRECTION

PATENT NO. : 9,151,979 B2  
APPLICATION NO. : 14/139730  
DATED : October 6, 2015  
INVENTOR(S) : Shuai You et al.

Page 1 of 1

It is certified that error appears in the above-identified patent and that said Letters Patent is hereby corrected as shown below:

In Item 63 the Related U.S. Patents section on the title page of the patent, the Application number listed as "PCT/CN1012/086192" should read "PCT/CN2012/086192".

Signed and Sealed this  
Twenty-first Day of June, 2016

Michelle K. Lee  
*Director of the United States Patent and Trademark Office*